No. 799,242. PATENTED SEPT. 12, 1905.
W. C. KLUNDER & J. E. STOBBE.
MACHINE FOR DESTROYING POTATO BUGS.
APPLICATION FILED NOV. 22, 1904.
3 SHEETS—SHEET 3.
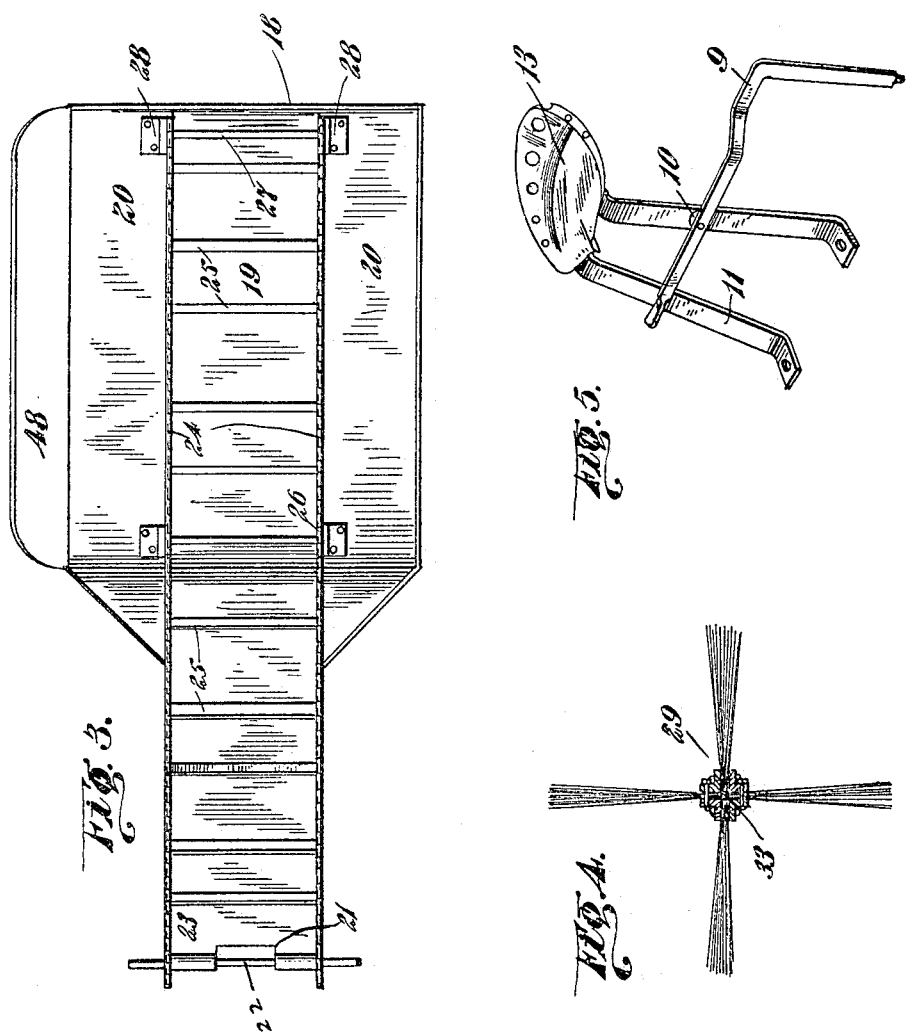

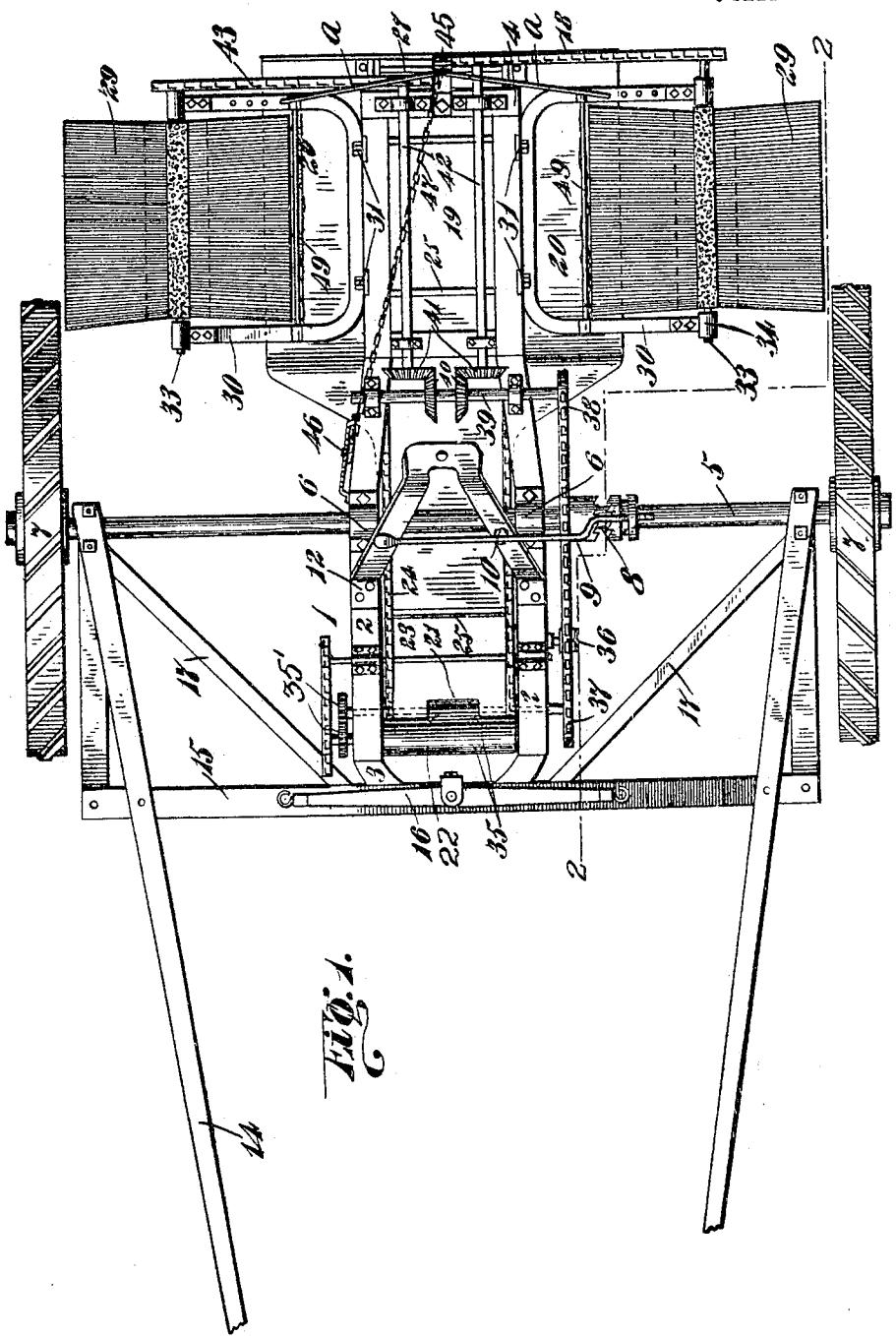

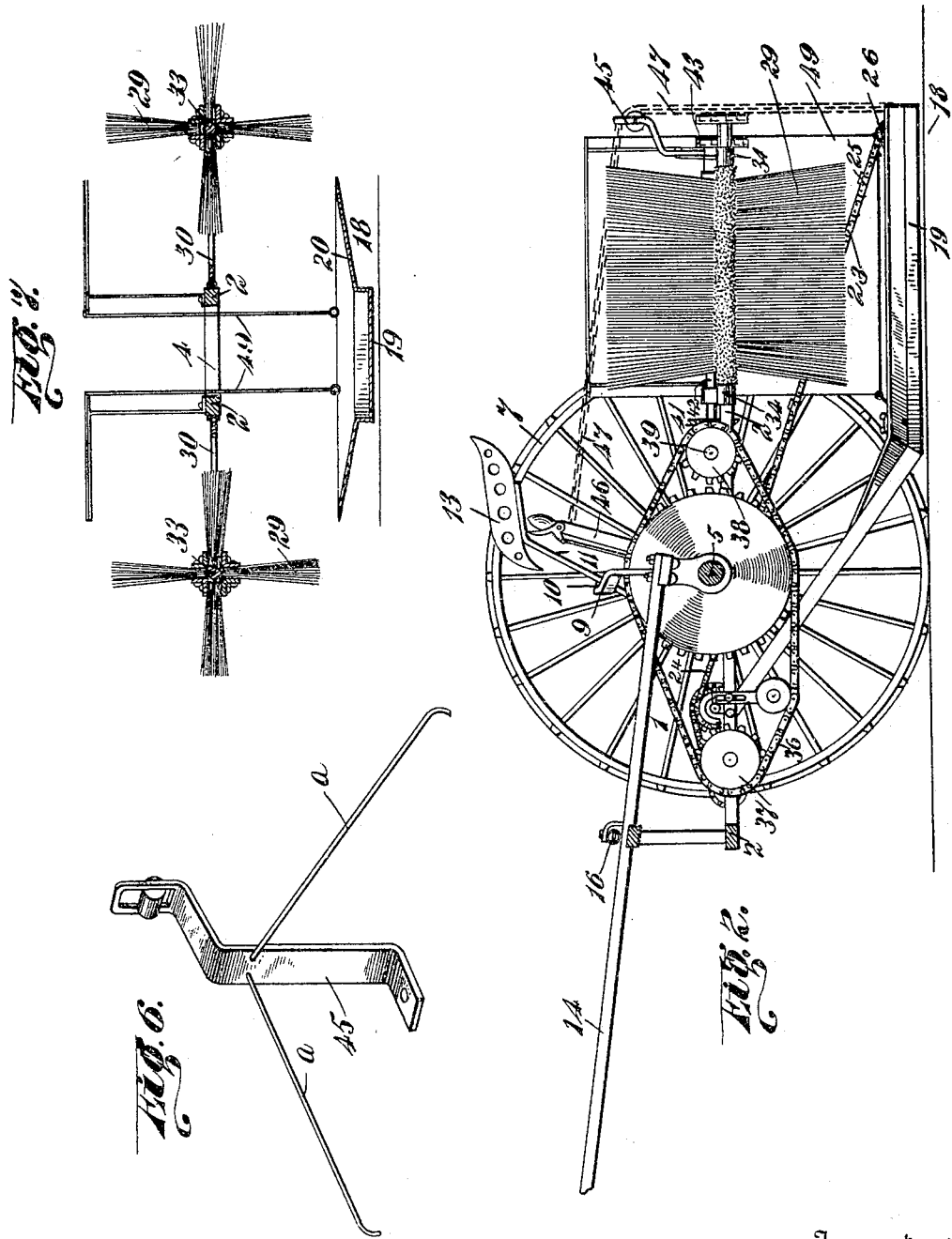

UNITED STATES PATENT OFFICE.

WILLIAM C. KLUNDER AND JACOB E. STOBBE, OF MONTAGUE, MICHIGAN.

MACHINE FOR DESTROYING POTATO-BUGS.

No. 799,242.     Specification of Letters Patent.     Patented Sept. 12, 1905.

Application filed November 22, 1904. Serial No. 233,846.

*To all whom it may concern:*

Be it known that we, WILLIAM C. KLUNDER and JACOB E. STOBBE, citizens of the United States, residing at Montague, in the county of Muskegon and State of Michigan, have invented certain new and useful Improvements in Machines for Destroying Potato-Bugs; and we do declare the following to be a full, clear, and exact description of the invention, such as will enable others skilled in the art to which it appertains to make and use the same.

This invention relates to machines for destroying potato-bugs; and one of the objects of the same is to provide a light, strong, and efficient implement to be drawn along between the rows of potatoes by a single draft-animal and to provide a pan or tray to slide upon the ground and a pair of rotary brushes or brooms to sweep the bugs off the vines into the pan or tray, where they are conveyed by an endless carrier to a pair of crushing-rollers.

Another object is to provide a simple and comparatively inexpensive machine of the character referred to which will be reliable in use and which will not be liable to get out of order.

These and other objects are attained by means of the construction illustrated in the accompanying drawings, in which—

Figure 1 is a plan view of a machine constructed in accordance with our invention, the driver's seat being removed from the frame. Fig. 2 is a vertical longitudinal section of the same on the line 2 2, Fig. 1. Fig. 3 is a plan view of the pan or tray and the traveling carrier mounted therein. Fig. 4 is a detail sectional view of one of the brushes or brooms. Fig. 5 is a perspective view of the driver's seat, its standard, and a clutch-lever mounted therein. Fig. 6 is a similar view of a support for a lifting-chain for raising the pan or tray and hook-rods for elevating the brushes; and Fig. 7 is a transverse section through the pan and brushes, the endless carrier being removed.

Referring to the drawings for a more particular description of our invention, the numeral 1 designates a frame comprising parallel side bars 2, a curved front bar 3, and a rear cross-bar 4. The frame 1 is mounted upon an axle 5, journaled in bearings 6 upon the frame, and upon the outer ends of the axle 5 traction-wheels 7 are mounted. A clutch 8 upon the shaft 5 is adapted to be drawn into and out of engagement by means of a lever 9, pivoted at 10 upon the curved standard 11, bolted to the frame 1 at 12. A driver's seat 13 is secured at the top of the standard 11. A pair of shafts 14 are secured at their rear ends to clips on the axle 5, and a cross-bar 15, extending between the shafts, carries a swingletree 16, said cross-bar being suitably braced by the diagonal braces 17.

A sheet-metal tray 18 of a width substantially corresponding to the distance between two rows of potato-vines and adapted to be drawn over the ground between said rows consists of a depressed central portion 19 and outwardly-inclined side portions 20, the front portion of said tray extending upwardly and provided with a hinged portion 21. The tray or pan 18 is pivoted under the frame 1 upon a rod 22. An endless carrier 23 is mounted to move in the depressed portion 19 of the tray or pan 18, said endless carrier comprising the drive-chains 24 and the transverse scrapers 25, said scrapers adapted to elevate the bugs brushed off the vine into said tray by suitable revolving brushes, presently to be described. The drive-chains 24 pass around sprocket-wheels 26, secured to shafts 27, mounted in suitable bearings 28, rising from the pan or tray 18. Revolving brushes 29 are journaled in frames 30, hinged at 31 to the frame-bars 2. The brushes 29 are secured to an angle-iron core, through which passes a shaft 33, said shaft being journaled in bearings 34 at the opposite ends of the brush-frames 30. These revolving brushes are adapted to knock the bugs off the vines into the tray or pan 18, and then the bugs are conveyed by the carrier 23 up the inclined portion of the tray and deposited between a pair of crushing-rollers 35, suitably journaled in the frame of the machine and driven by a drive-chain 36, passing over a sprocket 37 on one of the roller-shafts, said chain also passing over a sprocket-wheel 38, carried by a shaft 39, provided with oppositely-disposed bevel-gears 40, which mesh with similar gears 41, carried upon the shafts 42, journaled in parallel relation upon the frame of the machine, said shafts 42 carrying suitable sprocket-wheels to engage chains 43 for driving the revolving brushes 29. The brush-frames 30 may be raised and lowered by means of hook-rods *a*, connected at their ends to a brush-frame and to a standard 45. The tray or pan 18 is also adjustable vertically at its rear end by means of a lever 46, connected to a chain 47, secured at its opposite end to the rear end portion of the tray or pan 18 and passing over a pulley on the standard 45. The tray or pan 18 may be provided with suitable adjustable side portions 48. In order to prevent the bugs from being thrown over the tray by means of the brushes, we have provided suitable canvas curtains 49, which are properly disposed relatively to the brushes. These curtains are suitably sustained upon metal frames, as shown.

The operation of our implement may be described as follows: The machine is drawn between two rows of potato-vines by means of a suitable draft-animal. The clutch 8 having been shifted by the lever 9, the brushes 29 are revolved in the direction indicated by the arrows to sweep the bugs off the vines into the tray 18, where they are carried, by means of the carrier 23, up and deposited between the rollers 35, where they are crushed and thrown to the ground to be utilized as a fertilizer. The rollers 35 are revolved by means of the connecting-gears 35', actuated by the chain 35'', passing around a sprocket-wheel on the end of shaft 35$^a$ and a similar sprocket-wheel on the end of the shaft of the outer roller 35. Suitable scrapers are provided for cleaning the rollers 35.

From the foregoing it will be obvious that a machine made in accordance with our invention will be comparatively simple and inexpensive, not liable to get out of order, is reliable and efficient in use, and may be managed by a single person.

Various changes in the shape, proportions, and minor details of construction may be resorted to without departing from the principle or sacrificing any of the advantages of the invention.

Having thus described our invention, what we claim as new, and desire to secure by Letters Patent, is—

The herein-described machine for destroying potato-bugs, comprising a frame mounted upon wheels, revolving brushes journaled in an adjustable frame and consisting of angle-irons, clamping-bars for clamping the brushes in place, said brushes adapted to be revolved oppositely to sweep the bugs from the vines, and a centrally-disposed tray, an endless carrier traveling therein and adapted to carry the bugs upwardly, chains and levers for adjusting said tray vertically, rollers for crushing the bugs and curtains suspended above the tray for preventing the bugs from being swept off the tray, substantially as described.

In testimony whereof we have hereunto set our hands in presence of two subscribing witnesses.

W. C. KLUNDER.
JACOB E. STOBBE.

Witnesses:
S. H. WATSON,
CORNELIA WATSON.